United States Patent [19]

Machurat et al.

[11] Patent Number: 4,467,055

[45] Date of Patent: Aug. 21, 1984

[54] FILLED POLYMERIC COMPOSITIONS COMPRISING NOVEL POLYMER/FILLER INTERFACING ADDITIVE

[75] Inventors: Jean Machurat, Neuville sur Saone; Jean-Claude Morawski, Chassieu; Gerard Soula, Meyzieu, all of France

[73] Assignee: Rhone-Poulenc Chimie de Base, Courbevoie, France

[21] Appl. No.: 423,264

[22] Filed: Sep. 24, 1982

[30] Foreign Application Priority Data

Sep. 30, 1981 [FR] France ............................... 81 18381

[51] Int. Cl.³ ........................... C08K 5/20; C08K 3/36
[52] U.S. Cl. ..................................... 523/200; 523/212; 523/213; 523/216; 524/571; 524/601; 524/606
[58] Field of Search ............... 523/200, 212, 213, 216, 523/205, 209

[56] References Cited

U.S. PATENT DOCUMENTS 2,841,504  7/1958  Liggett ................................ 523/200
3,224,998 12/1965  Kirkconnell ....................... 523/200
4,348,311  9/1982  Machurat et al. .................. 524/530

FOREIGN PATENT DOCUMENTS 559225  2/1975  Switzerland ....................... 523/205

OTHER PUBLICATIONS

Brydson, Plastics Materials, Newnes-Butterworths, 1975, pp. 392, 393, 1975.

*Primary Examiner*—Lewis T. Jacobs
*Attorney, Agent, or Firm*—Burns, Doane, Swecker & Mathis

[57] ABSTRACT

Polymeric, advantageously elastomeric, e.g., natural or synthetic rubber, matrices including a reinforcing amount of a filler therefor, e.g., inorganic particulates, further comprise, as an interfacing additive between the matrix and the reinforcing filler, the condensation product of at least one polyamine with at least one carboxylic acid.

32 Claims, No Drawings

FILLED POLYMERIC COMPOSITIONS COMPRISING NOVEL POLYMER/FILLER INTERFACING ADDITIVE

CROSS-REFERENCE TO RELATED PATENTS AND APPLICATIONS

Our U.S. Pat. Nos. 4,322,336 and 4,348,311, and copending divisional application, Ser. No. 382,214, filed May 26, 1982, all assigned to the assignee hereof.

BACKGROUND OF THE INVENTION

1. Field of the Invention

The present invention relates to novel, improved filled polymeric, especially filled elastomeric compositions, and, more especially, to such filled compositions comprising a matrix/filler interfacing additive which comprises the reaction product of at least one polyamine with at least one carboxylic acid.

2. Description of the Prior Art

It is of course well known to this art that the problem of reinforcing polymeric materials with inorganic fillers is both complex and difficult. On the one hand, the reinforcing filler must be thoroughly dispersed in the polymer matrix, while on the other hand good bonding must be obtained between the filler and the polymeric material. Furthermore, the reinforcement must be carried out economically, without entailing any secondary disadvantage during handling, such as toxicity. This explains why a large number of solutions have been proposed to the art, often specific to a particular filler and particular polymer, taking into account various factors such as the matrix of the polymer, the nature of the possible chemical bonds, and the surface chemistry of the filler. Coupling agents are being studied at the present time. Of these, special mention should be made of the family of silanes and particularly the mercaptosilanes. This has been described in the literature, particularly in *Rubber World*, October 1979, pages 53-58 and in *European Rubber Journal*, March 1979, pages 37-46.

Unfortunately, the use of silane coupling agents has encountered two serious disadvantages: firstly, their cost, which under existing conditions is very high relative to that of the filler proper, and, secondly, their odor, which virtually prevents their use beyond the threshold of 1% by weight relative to the polymer.

Our U.S. Pat. No. 4,322,336 features improving the compatibility of plasticizers and reinforcing fillers in polymers, employing additives based on alkenyl succinimides.

Also, our U.S. Pat. No. 4,348,311 features a filler reinforced elastomer, and comprising a coupling agent therefor, such coupling agent including at least one silane and at least one succinimide per our '336 patent.

This latter technique affords excellent results as compared with silanes used alone, but uses a small enough quantity of silanes, substantially without giving rise to the disadvantage inherent in same. And unlike carbon black, the precipitated silicas which impart a considerable degree of reinforcement have the disadvantage of making rubber mixtures too viscous. The main reason for the high viscosity is the strength of the silica network which is established in the rubber [A. Voet and J. C. Morawski, *Rubber Chem. Technical*, 47, 4, pp. 765-777 (1974)].

Indeed, our experimentation has demonstrated that for such network to be weakened, the interaction among the particles thereof has to be reduced.

SUMMARY OF THE INVENTION

Accordingly, a major object of the present invention is the provision of an improved additive for incorporation into filled polymeric/elastomeric matrices, said additive comprising at least one moiety having, firstly enhanced affinity for the particulate reinforcing filler, especially for silica particles, than for the other constituents of the polymeric/elastomeric composition, e.g., a rubber mixture, and, secondly, also comprising an organophilic moiety mobile enough to be intimately admixed with the polymeric/elastomeric chains, thus enabling reduction of the cohesion existing among the particles of the reinforcing filler, e.g., silica particles.

An additive of such type will hereinafter be designated as an "interfacing" additive.

Also provided hereby is an improved technique for incorporating a particular interfacing additive in a polymer/elastomer composition.

DETAILED DESCRIPTION OF THE INVENTION

More particularly according to the present invention, it has now surprisingly been found that an interfacing additive of the desired type is advantageously comprised of at least one polyamine and at least one carboxylic acid.

Even more particularly, it has now been found that an interfacing additive of the desired type comprises the reaction product of at least one polyamine with at least one carboxylic acid.

Exemplary carboxylic acids which can be used to prepare the various interfacing additives are:

(i) natural fatty acids, such as stearic, oleic, linoleic, linolenic and ricinoleic acids; and (ii) synthetic carboxylic acids, such as butanoic, hexanoic, heptanoic, octanoic, decanoic, dodecanoic, tridecanoic, hexadecanoic and versatic.

The interfacing additives of the invention are prepared in known manner by condensing a carboxylic acid, e.g., as above defined, or a mixture of such acids, with a polyamine, in a polyamine/carboxylic acid molar ratio of less than 1.

When the polyamine employed contains two amino groups, a molar ratio of from 0.4 to 0.6 provides additives containing a major portion of bis-amides; a molar ratio of approximately 1, and preferably ranging from 0.7 to 0.95, provides additives containing a major portion of mono-amides. When the polyamine contains 3 or more amino groups, a molar ratio of less than 0.4 provides a tris-amide or polyamide.

The condensation of the carboxylic acid with the polyamine, which is used to prepare the corresponding amide, is carried out by a known method at a temperature of from 80° to 200° C. The operation preferably takes place at a temperature of from 120° to 180° C., utilizing a molar ratio of less than 1.

Representative polyamines which can be used to obtain the subject amides include:

(i) polyalkylene amines in which the alkylene radicals are straight or branched-chain containing from 2 to 12 carbon atoms, or such polyalkylene amines bearing at least one hydroxyalkyl or aminoalkyl substituent on the nitrogen atom thereof;

(ii) polyoxaalkylene amines in which the oxaalkylene radicals are straight or branched-chain and contain 2 to 3 carbon atoms; and (iii) tertiary aminoalkyl amines of the general formula:

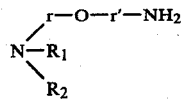

in which r represents an ethylene or propylene radical, r' represents a trimethylene or propylene radical, $R_1$ represents an $-r-O-r'-NH_2$ or $-r'-NH_2$ radical, and $R_2$ represents an $-r-O-r'-NHS_2$, $-r'-NH_2$, phenyl or $C_2-C_4$ alkyl radical.

Exemplary of the unsubstituted polyalkylene amines (i) are:

[1] Methylene amines, such as trimethylene diamine, tetramethylene diamine, pentamethylene diamine, hexamethylene diamine, heptamethylene diamine, octamethylene diamine, nonamethylene diamine, decamethylene diamine, di(trimethylene) triamine and di(hexamethylene)triamine;

[2] Ethylene amines, such as ethylene diamine, diethylene triamine, triethylene tetramine, tetraethylene pentamine and pentaethylene hexamine;

[3] Propylene amines, such as propylene diamine, dipropylene triamine, tripropylene tetramine, and the like; and

[4] Cyclic homologs thereof of the aminoalkylpiperazine type, such as 1,4-bis(2-aminoethyl)piperazine or 1,4-bis(4-aminobutyl)piperazine.

The ethylene polyamines are particularly useful. Same are described in substantial detail under the title "Diamines and Higher Amines" in *Encyclopedia of Chemical Technology*, 2nd Edition, Kirk & Othmer, Volume 7, pages 27–39, Interscience Publishers, New York (1965). These compounds may be used alone, or mixed together or with their cyclic homologs.

Exemplary of the polyalkylene amines which are substituted on the nitrogen by one or more hydroxyalkyl groups are those wherein the hydroxyalkyl group or groups contain less than 8 carbon atoms, such as: N-(2-hydroxyethyl)ethylene diamine, N,N-bis(2-hydroxyethyl)ethylene diamine, mono-hydroxypropyldiethylene triamine, dihydroxypropyltetraethylene pentamine, N-(3-hydroxypropyl)tetramethylene diamine, and the like.

Exemplary of the polyalkylene amines which are substituted on the nitrogen by one or more aminoalkyl groups are those wherein the aminoalkyl group or groups contain less than 4 carbon atoms, such as: tris(2-aminoethyl)amine, N-(2-aminoethyl)tetraethylene pentamine; N,N,N'-tris(3-aminopropyl)ethylene diamine, N,N,N',N'-tetrakis(3-aminopropyl)ethylene diamine and N-(3-aminoethyl)trimethylene diamine.

Exemplary of the polyoxaalkylene amines (ii) are: 1,10-diamino-4,7-dioxadecane, 1,13-diamino-4,7,10-trioxatridecane, 1,8-diamino-3,6-dioxa-1,5,8-trimethyloctane, tris-1,2,3-(2-amino-2-methylethoxy)propane, and the like.

Other examples of polyoxaalkylene amines which can be used are described in French Pat. No. 1,547,228.

Exemplary of the tertiary aminoalkyl amines (iii) which can be used are those described in French Pat. No. 75.39690 published under No. 2,307,795, particularly tris(3-oxo-6-aminohexyl)amine and N-ethyl-bis(3-oxa-6-aminohexyl)amine.

The additives according to the invention may be used simultaneously with the silanes. A portion of the silanes may advantageously be replaced by the interfacing additives according to the invention. Marked synergism then results, especially in the case of reinforced synthetic rubbers.

The silanes utilized according to the invention have the general formula:

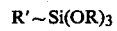

wherein R' is a reactive organic group, such as a mercapto or azo group, or the like, typically linked to the silicon atom through a short alkylene chain (~ in the above formula), and OR is a hydrolyzable alkoxy group.

Preferred silanes according to the invention are sulfur-containing silanes, especially those of the type gamma-mercaptopropyltrimethoxysilane and bis(3-triethoxysilylpropyl)tetrasulfide.

It is also possible to use silanes in which the reactive group is a carbamoylazoformate.

Other examples include silanes of the type di(methylpropyldiethoxysilane)tetrasulfide, hexamethylcyclotrisilthiane, ethyltriethoxysilanepolysulfide and dimethylpropylethoxysilanemonosulfide.

The interfacing additives according to the invention may be incorporated into suitable polymeric/elastomeric composition either in their pure form or in a dilute form, namely, premixed with an absorbent carrier in proportions such as to provide a product which can be handled easily in powdered or granulated form. Generally, at least 30 parts of reinforcing filler, e.g., silica, are required per 70 parts of active product.

The fillers or reinforcing materials according to the invention are advantageously a natural or synthetic inorganic filler.

The invention is more particularly concerned with the use of the precipitated silicas as the reinforcing filler, for example, those described in the aforenoted copending application, Ser. No. 218,264.

Such silicas are conveniently prepared utilizing any one of a number of processes.

In a first type of process, an acidifying agent, such as carbonic acid or an inorganic acid, is added to an aqueous silicate solution; the addition is terminated following the appearance of opalescence, and a maturing time is observed before the acidification of the medium is resumed, as, e.g., in the processes described in French Pat. No. 2,208,950 or U.S. Pat. No. 3,503,797.

In a second type of process, the first interruption of acid addition is made beyond the point of opalescence, i.e., between opalescence and gelling, as described in French Pat. No. 2,159,580 and U.S. Pat. No. 4,243,428.

Finally, the addition of acid need not be interrupted, and a solution of alkali metal silicate and a solution of acid in a silicate solution may be added simultaneously, as, e.g., described in French Pat. No. 1,352,354 and U.S. Pat. No. 3,235,331.

There are obviously many possible modifications to these processes which make it possible to control the properties of the resultant silica particulates, and the above description is not in any way intended to restrict the type of silica which may be used within the ambit of the present invention.

The silica advantageously employed according to the present invention can be used in combination with other reinforcing fillers. An especially preferred formulation comprises, in parts by weight:

| | |
|---|---|
| (i) Rubber (especially natural rubber) | 100 |
| (ii) Silica | 10 to 60 |
| (iii) Carbon black | 10 to 60 |
| (iv) Additive according to the invention, expressed as a percentage of silica | 1 to 10% |

The polymeric materials reinforced consistent herewith preferably comprise polymeric materials which are elastomeric, such as natural or synthetic rubber, albeit same may just as well comprise synthetic polymers such as polyamides or polyesters.

In order to further illustrate the present invention and the advantages thereof, the following specific examples, test procedures and additives are given, it being understood that same are intended only as illustrative and in nowise limitative.

EXPERIMENTAL

The silane used in the examples to follow was gamma-mercaptopropyl-trimethoxysilane, marketed by Union Carbide as A 189.

The following additives were prepared:

Additive No. 1; Condensation of tetraethylene pentamine with stearic acid

A 2 liter four-necked reaction flask was employed, fitted with a mechanical agitator, a thermometer, a bromine funnel and a Dean & Stark apparatus. 356 g of stearic acid (1.25 mole) and 125 ml of xylene were successively introduced into the flask. The mixture was heated under reflux, then 189 g of tetraethylene pentamine (1 mole) in solution in 125 ml of xylene were added thereto through the bromine funnel, over the course of 45 minutes. The water of reaction was gradually distilled and separated by the Dean & Stark apparatus as it was formed. When all of the water had been eliminated, the reaction medium was maintained under reflux for 1 hour, then cooled to 100° C. The mixture was then filtered through Clarcel and the xylene evaporated at 140° C. and 3000 Pa. A product which was solid when cold was obtained, corresponding essentially to an alkyl amide and also to an alkyl imidazoline (structure determined by infra-red and nuclear magnetic resonance; Elementary analysis indicated:

| | Theory (%) | Found (%) |
|---|---|---|
| Total nitrogen | 13.4 | 12.4 |
| Acid index | 0 | 7 mg KOH/g |

Additive No. 2; Condensation of tetraethylene pentamine with linoleic acid 200 ml of xylene and 302.4 g of tetraethylene pentamine (1.6 moles) were introduced into the reactor. The mixture was agitated and heated to boiling point. A solution containing 200 ml of xylene and 559 g of linoleic acid (2 moles) was then added thereto over the course of one hour. The water formed during the reaction was eliminated by azeotropic entrainment. When all of the solution had been added, the xylene was distilled under reduced pressure (13,500 Pa). The product obtained was filtered through Clarcel and then analyzed. Infra-red spectrographic analysis evidenced the mixture to consist of amides and imidazolines. The chemical analysis was as follows:

Residual acid index: 35.8 mg/KOH/g.
Proportion of nitrogen: theoretical: 15.49%; measured: 12.80%.

Additive No. 3; (reference product in French Pat. No. 2,472,000)

A 2 liter three-necked reaction flask was employed, equipped with a mechanical agitator, a bromine funnel, a thermometer and a distillation head succeeded by a condensor and a receiver. 665 g of succinic tetrapropenyl anhydride (i.e., 2.5 moles) were poured into the flask and heated to 130° C.

189 g of tetraethylene pentamine (i.e., 2 moles) were then added thereto over the course of 30 minutes. The mixture was brought to 160° C. at a pressure of 3350 Pa. When all of the water formed during the reaction had been distilled (3 hours), the mixture was cooled:

The nitrogen analysis was as follows: Theory 14%; Measured 13.8%.

Additive No. 4; Condensation of tetraethylene pentamine with oleic acid 250 ml of xylene and 706.5 g of oleic acid (2.5 moles) were introduced into the reactor. The mixture was agitated and heated to boiling point. A solution containing 378 g of tetraethylene pentamine (2 moles) and 250 ml of xylene was added thereto, over the course of 1 hour. The water formed during the reaction was eliminated by azeotropic entrainment. When all of the solution had been added, the xylene was distilled at reduced pressure (p=13,500 Pa). The product obtained was filtered through Clarcel, then analyzed.

Proportion of nitrogen: theoretical: 15.42%; measured: 12.73%.

Additive No. 5; Condensation of tetraethylene pentamine with linolenic acid 250 ml of xylene and 378 g of tetraethylene pentamine (2 moles) were introduced into the reactor. The mixture was agitated and heated to boiling point. A solution containing 250 ml of xylene and 695.5 g of linolenic acid (2.5 moles) was then added thereto, over the course of 1 hour. The water formed during the reaction was removed by azeotropic entrainment. When all of the solution had been added, the xylene was evaporated at reduced pressure (17,200 Pa). The product obtained was filtered through Clarcel, then analyzed. As in the previous preparations, analysis by infra-red spectrography evidenced the mixture to consist of amides and imidazolines.

The chemical analysis was as follows:
Residual acid index: 5.5 mg KOH/g.
Proportion of nitrogen: theoretical: 15.56%; measured: 12.80%.

Additive No. 6; Condensation of tetraethylene pentamine with lauric acid 300 ml of xylene and 453.6 g of tetraethylene pentamine (2.4 moles) were introduced into the reactor. The mixture was agitated and heated to boiling point. A solution containing 250 ml of xylene and 601 g of lauric acid (3 moles) was then added thereto, over the course of 2 hours. The water formed during the reaction was removed by azeotropic entrainment. When all of the solution had been added, the xylene was distilled at reduced pressure (13,500 Pa). The product obtained was filtered through Clarcel, then analyzed. As in the previous preparations, analysis by infra-red spectrography evidenced the mixture to consist of amides and imidazolines.

The chemical analysis was as follows:
Residual acid index: 9.4 mg KOH/g.
Proportion of nitrogen: theoretical: 18.835%; measured: 15.90%.

Additive No. 7; Condensation of diethylenetriamine with oleic acid

A 2-liter four-necked reactor was employed, equipped with a mechanical agitator, a thermometer, a bromine funnel and a Dean & Stark apparatus, and 900 g of oleic acid (3.2 moles) and 350 g of xylene were successively introduced therein. The mixture was agitated and heated to boiling point. 350 g of diethylenetriamine (3.3 moles) were then added thereto, over the course of 1 hour, after which the temperature was raised. From 145° C. the water from the reaction was eliminated. The temperature of the mixture was maintained at 168° C. for 3 hours, after which the solvent was eliminated. The unreacted amine and the xylene were thus recovered (quantity of amine extracted: 69 g; water removed: 116)

Nitrogen content: 6.1%.

The following silica was employed:

| Silica: | | |
|---|---|---|
| (i) loss of weight on combustion | <12.5 | |
| (ii) pH (5 g/100 cc) | 5 | |
| (iii) BET surface area, m²/g | 175 | |
| (iv) Diameter of ultimate particles | 20 μm | |
| (v) CTAB surface area, m²/g | 175 | |

The CTAB surface area (external surface area) by adsorption of cetyl trimethyl ammonium bromide at pH 9 was determined by the method described by Jay, Jansen and G. Kraus in *Rubber Chemistry and Technology*, 44, pages 1287–1296 (1971).

In order to demonstrate the advantages of the invention, certain tests were carried out in a rubber mix; the operation was carried out in a 1 liter internal Banbury mixer, then continued in a cylinder type mixer.

The following tests were carried out:

Mechanical, Static and Dynamic Tests (1) Measured the rheological properties of the mix during vulcanization.
(a) Minimum torque (Cm): consistency of unvulcanized mix ("crude" mix) at testing temperature;
(b) Maximum torque (CM): consistency of mix after cross-linking;
(c) Δtorque: CM-Cm, related to the extent of cross-linking;
(d) Induction Period: time required to initiate cross-linking at testing temperature;
(e) Index: related to the speed of vulcanization (optimum time-induction period);

(f) Optimum time: $X = \frac{(CM - Cm) \times 90}{100} + Cm$

Torque $X \longrightarrow Y$ minutes = Optimum Time
(ordinate)   (abscissa)

These properties are described in particular in the *Encyclopedia of Polymer Science and Technology*, 12, page 265 (Interscience Publishers-John Wiley & Sons, Inc.).

(2) Static properties:
Those which are measured in accordance with the following standards:
(a) ASTM D 412-51 T:
  Breaking strength, Pa (Tensile strength)
  Elongation, %
  Modulus, Pa
(b) ASTM D 2240-75:
  Shore A hardness
(c) NF T 47-126:
  Tear strength, kg/cm
(d) DIN 53516:
  Abrasion (resistance to)

(3) Dynamic properties

ASTM D 623-67
Goodrich Flexometer
This apparatus is for subjecting a vulcanizate to alternating deformations to determine its resistance to fatigue.
(a) Static compression (SC%): deflection under constant load;
(b) Permanent deformation (PD%): percentage of residual deformation after test;
(c) Dynamic compression (DC%): % of deformation during test;
  DCO: dynamic compression at beginning of test;
  DCF: dynamic compression upon completion of test;

$\Delta DC = DCF - DCO$:

evolution of dynamic compression, which is related to resistance to fatigue;
(d) ΔT base: ΔT between the temperature at the surface of the sample (at its base) and at oven temperature;
(e) ΔT core: ΔT between the temperature at the core of the sample and at oven temperature;
(f) Test conditions:
  Load 24 lbs, deflection 22.2%, frequency 21.4 Hz oven temperature=50° C.

EXAMPLE 1

In this example, a series of tests was carried out utilizing the following formulation, in parts by weight:

| | |
|---|---|
| (i) Butadiene/Styrene copolymer (SBR 1500) | 100 |
| (ii) Aromatic oil (DUTREX V10) | 20 |
| (iii) Zinc oxide | 4.00 |
| (iv) Stearic acid | 1.50 |
| (v) N—isopropyl-N—phenyl-N'—phenyl-p-phenyldiamine (antioxidant PERMANAX IPPD) | 1.50 |
| (vi) N—(1,3-dimethylbutyl)-N'—phenyl-p-phenylenediamine (antioxidant PERMANAX 6PPD) | 1.50 |
| (vii) Silica | 60.00 |
| (viii) Polyethylene glycol (PEG 4000) | 2.40 |
| (ix) N—cyclohexyl-2-benzothiazyl sulfenamide (Vulcafor CBS) | 3.60 |
| (x) Sulfur | 2.80 |
| (xi) Additive according to tests, expressed as percentage of the silica. | |

Operation

Banbury:
(1) SBR;

(2) Silica (90%)+ZnO+Antioxidant+Stearic Acid+PEG;
(3) Oil+Silica (10%)+Additive (if appropriate);
(4) Completion of mixing, 120° C.;
(5) Calendering on open mill.

Open Mill:
(1) Mix+Sulfur+Accelerator;
(2) Mixing;
(3) Conversion into a thin sheet
(4) Drawing into a sheet.

Results

The results obtained are reported in the Tables I to III, to follow.

It will be appreciated:

(a) In Table I (Monsanto Rheometer), that the product according to the invention, either alone or combined with the silane, activated vulcanization and reduced the viscosity of the mix;

(b) In Table II, that when the product of the invention was used alone, it did not substantially alter the static properties of the vulcanized materials. However, it considerably improved resistance to tearing.

Used in combination with the silane in the ratio: 3% of additive No. 1, 1% of silane afforded spectacular improvement, similar to that obtained with 3% of silane (except for resistance to abrasion). Resistance to tearing was further greatly improved with additive No. 1 combined with silane; in Table III, when used alone, additive No. 1 did not alter the properties of the vulcanized materials. On the other hand, when same was combined with 1% of silane, the results obtained were equivalent to those obtained with 3% of silane alone. It even resulted in less heating.

EXAMPLE 2

A series of tests was carried out utilizing a formulation of natural rubber, SMR 5L, and having the following composition:

| | |
|---|---|
| (i) SMR 5 L | 100.00 |
| (ii) Aromatic Oil, DUTREX V 10 | 20.00 |
| (iii) Stearic Acid | 1.50 |
| (iv) ZnO | 4.00 |
| (v) Antioxidant IPPD | 1.50 |
| (vi) Antioxidant 6PPD | 1.50 |
| (vii) Vulcafor CBS | 1.50 |
| (viii) Silica | 60.00 |
| (ix) PEG 4000 | 3.00 |
| (x) Sulfur | 2.80 |
| (xi) Additive according to tests, expressed as percentage of the silica. | |

Operation

Banbury:
(1) SMR 5L;
(2) Silica (90%)+ZnO=Antioxidant+Stearic Acid+PEG;
(3) Oil+Silica (10%)+Additive, if appropriate;
(4) Completion of mixing, 120° C.;
(5) Calendering on open mill.

Open mill:
(1) Mix+sulfur+accelerator;
(2) Mixing;
(3) Conversion into a thin sheet;
(4) Drawing into a sheet.

Results (a) Monsanto Rheometer 150° C. (Table IV):
Vulcanization was accelerated with the additive used alone, or in combination with the silane.

(b) Static Properties (Table V):
Used alone, the two additives improved the modulus 300% and resistance to tearing.
In combination with 1% of the silane, the additive provided properties equivalent to those obtained with 3% of the silane alone.

(c) Dynamic Properties (Goodrich: Table VI):
Used alone, the additive according to the invention improved all of the important dynamic properties: $\Delta DC$, $\Delta T$ core and base, permanent deformation.
There was a very spectacular reduction in core heating.

TABLE I

| | ADDITIVES | | | MONSANTO RHEOMETER AT 150° C. | | | | | |
|---|---|---|---|---|---|---|---|---|---|
| | SILANE | ADDITIVE OF INVENTION | | | | | | | |
| TESTS | A 189 | No. | % | CM | Cm | Δ C. | T.90 | T + 2 | INDEX |
| 1 | 0% | No. 1 | 0% | 102 | 19 | 83 | 20.0 | 12.5 | 7.5 |
| 2 | 3% | No. 1 | 0% | 99 | 11.5 | 87.5 | 15.75 | 8.25 | 7.5 |
| 3 | 0% | No. 1 | 3% | 92 | 13 | 79 | 16.50 | 10.3 | 6.2 |
| 4 | 1% | No. 1 | 3% | 96 | 11 | 85 | 12.75 | 6.75 | 6.0 |

TABLE II

| | ADDITIVES | | | STATIC PROPERTIES OF VULCANIZED MATERIALS | | | | | | |
|---|---|---|---|---|---|---|---|---|---|---|
| | SILANE | ADDITIVE OF INVENTION | | SHORE A HARDNESS | MODULUS 100% M.Pa | MODULUS 300% M.Pa | ULTIMATE BREAKING STRENGTH M.Pa | ELONGATION % | TEAR STRENGTH kg/cm | ABRASION DIN (loss) | DENSITY |
| TESTS | A 189 | No. | % | | | | | | | | |
| 1 | 0% | No. 1 | 0% | 66 | 2.0 | 5.1 | 13.5 | 441 | 22 | 225 | 1.19 |
| 2 | 3% | No. 1 | 0% | 70 | 4.1 | 13.4 | 14.9 | 337 | 11 | 141 | 1.19 |
| 3 | 0% | No. 1 | 3% | 66 | 1.8 | 5.1 | 14.5 | 467 | 30 | 234 | 1.19 |
| 4 | 1% | No. 1 | 3% | 68 | 3.3 | 13.9 | 17.2 | 352 | 35 | 162 | 1.19 |

TABLE III

| | ADDITIVES | | | DYNAMIC PROPERTIES OF VULCANIZED MATERIALS - GOODRICH FLEXOMETER | | | | | | |
|---|---|---|---|---|---|---|---|---|---|---|
| TESTS | SILANE A 189 | ADDITIVE OF INVENTION NO. | % | SC % | DCO % | DCF % | Δ DC % | ΔT. BASE °C. | Δ T. CORE °C. | PD % |
| 1 | 0% | No. 1 | 0% | 10.6 | 6.7 | 8.55 | 1.85 | 33 | 115.5 | 5.45 |
| 2 | 3% | No. 1 | 0% | 10.0 | 2.4 | 2.7 | 0.3 | 28 | 91.5 | 2.3 |
| 3 | 0% | No. 1 | 3% | 10.4 | 6.6 | 10.7 | 4.1 | 33 | 117.0 | 5.8 |
| 4 | 1% | No. 1 | 3% | 10.9 | 3.2 | 3.2 | 0 | 25 | 82 | 2.8 |

TABLE IV

| | ADDITIVES | | | MONSANTO RHEOMETER AT 150° C. | | | | | |
|---|---|---|---|---|---|---|---|---|---|
| TESTS | SILANE A 189 | ADDITIVE OF INVENTION No. | % | CM | Cm | Δ C. | T. 90 | T + 2 | INDEX |
| 5 | 0% | — | — | 83.5 | 19.0 | 64.5 | 20.5 | 10.5 | 10.0 |
| 6 | 3% | — | — | 70.0 | 14.5 | 55.5 | 10.5 | 3.25 | 7.25 |
| 7 | 0% | No. 2 | 3% | 84.5 | 21.0 | 63.5 | 16.0 | 6.50 | 9.50 |
| 8 | 1% | No. 2 | 3% | 72.0 | 17.0 | 55.0 | 13.75 | 4.00 | 9.75 |
| 9 | 0% | No. 1 | 3% | 83.0 | 19.0 | 64.0 | 15.30 | 6.30 | 9.00 |
| 10 | 1% | No. 1 | 3% | 76.5 | 16.0 | 60.5 | 12.20 | 3.75 | 8.50 |

TABLE V

| | ADDITIVES | | | STATIC PROPERTIES OF VULCANIZED MATERIALS | | | | | | | |
|---|---|---|---|---|---|---|---|---|---|---|---|
| TESTS | SILANE A 189 | ADDITIVE OF INVENTION No. | % | SHORE A | MODULUS 100% M.Pa | MODULUS 300% M.Pa | ULTIMATE BREAKING STRENGTH M.Pa | ELONGATION % | TEAR STRENGTH kg/cm | ABRASION DIN (loss) | DENSITY |
| 5 | 0% | — | — | 65 | 1.6 | 3.6 | 20.4 | 713 | 58 | 279 | 1.17 |
| 6 | 3% | — | — | 65 | 2.4 | 6.7 | 24.1 | 653 | 54 | 171 | 1.17 |
| 7 | 0% | No. 2 | 3% | 69 | 1.8 | 4.3 | 21.6 | — | 64 | 244 | 1.17 |
| 8 | 1% | No. 2 | 3% | 68 | 2.2 | 6.7 | 24.7 | — | 66 | 224 | 1.17 |
| 9 | 0% | No. 1 | 3% | 66 | 1.6 | 5.0 | 18.4 | 543 | 62 | 305 | 1.17 |
| 10 | 1% | No. 1 | 3% | 67 | 2.7 | 10.1 | 23.3 | 515 | 71 | 203 | 1.17 |

TABLE VI

| | ADDITIVES | | | DYNAMIC PROPERTIES OF VULCANIZED MATERIALS - Goodrich Flexometer | | | | | | |
|---|---|---|---|---|---|---|---|---|---|---|
| TESTS | SILANE A 189 | ADDITIVE OF INVENTION No. | % | SC % | DCO % | DCF % | Δ DC % | Δ T BASE °C. | Δ T CORE °C. | PD % |
| 5 | 0% | — | — | 10.0 | 14.0 | 37.0 | 23.0 | 57.5 | 144 | 25 |
| 6 | 3% | — | — | 12.6 | 8.9 | 11.4 | 2.5 | 19.5 | 79.0 | 5.75 |
| 7 | 0% | No. 2 | 3% | 9.6 | 7.6 | 28.2 | 20.6 | 44 | 134 | 17.5 |
| 8 | 1% | No. 2 | 3% | 11.0 | 9.25 | 14.45 | 5.2 | 21.5 | 83.0 | 6.65 |
| 9 | 0% | No. 1 | 3% | 13.4 | 12.8 | 27.0 | 14.2 | 36 | 110 | 16.5 |
| 10 | 1% | No. 1 | 3% | 12.5 | 8.2 | 12.9 | 4.7 | 20.5 | 80.5 | 5.75 |

EXAMPLE 3

Another series of tests was carried out utilizing a natural rubber, and the following formulation:

| | | |
|---|---|---|
| (i) | SMR 5 L (NR) | 100.00 |
| (ii) | Stearic Acid | 1.50 |
| (iii) | DUTREX V 10 | 20.00 |
| (iv) | Zinc Oxide | 4.00 |
| (v) | Antioxidant IPPD | 1.50 |
| (vi) | Antioxidant 6PPD | 1.50 |
| (vii) | Accelerator Vulcafor CBS | 2.20 |
| (viii) | PEG 4000 | 1.60 |
| (ix) | Silica | 40.00 |
| (x) | Carbon Black N. 347 | 20.00 |
| (xi) | Sulfur | 2.50 |
| (xii) | Additive (1) | 2.00 |
| | (1) - 5% of silica | |

Operation

Banbury: 1st stage
   (1) Rubber + Antioxidant;
   (2) Filler (Silica + Carbon black);
   (3) Plasticizer + Stearic acid + PEG 4000 + Additive;
   (4) Completion of mixing.
Banbury: 2nd stage (24 hours later)
   (1) Mix;
   (2) Accelerator + Sulfur + ZnO;
   (3) Completion of mixing.
Open Mill (temperature 70°/80°):
   (1) Homogenization of mix and drawing into sheet.

TABLE VII

TEST WITH MONSANTO RHEOMETER AT 150° C.

| TESTS | ADDITIVE No. | CM | Cm | Δ C | T.90 | T + 2 | INDEX |
|---|---|---|---|---|---|---|---|
| 11 | — | 75 | 17 | 58 | 12'15" | 5'35" | 6'40" |
| 12 | 3 | 71 | 14 | 57 | 11'10" | 4'50" | 6'20" |
| 13 | 4 | 77 | 16.5 | 60.5 | 9'50" | 4'15" | 5'35" |
| 14 | 5 | 71.5 | 13.5 | 58 | 10'15" | 4'15" | 6'00" |
| 15 | 2 | 74 | 16.5 | 57.5 | 10'10" | 4'10" | 6'00" |
| 16 | 1 | 72 | 16.5 | 55.5 | 9'10" | 3'30" | 5'40" |
| 17 | 6 | 72.5 | 16 | 56.5 | 9'10" | 3'30" | 5'40" |
| 18 | 7 | 73 | 16 | 57 | 8'45" | 3'20" | 5'25" |

TABLE VIII

| TESTS | ADDITIVE No. | Δ SHORE | MODULUS 300% MPa | ULTIMATE BREAKING STRENGTH MPa | ELONGATION ON BREAK % | TEAR STRENGTH kg/cm | ABRASION DIN |
|---|---|---|---|---|---|---|---|
| | | | | STATIC PROPERTIES | | | |
| 11 | — | 65 | 5.1 | 23.5 | 734 | 61 | 192 |
| 12 | 3 | 65 | 5.5 | 23 | 660 | 60 | 171 |
| 13 | 4 | 62 | 6.2 | 23.2 | 652 | 59 | 168 |
| 14 | 5 | 64 | 6.3 | 22.6 | 630 | 54 | 176 |
| 15 | 2 | 65 | 5.6 | 23.1 | 684 | 63 | 168 |
| 16 | 1 | 63 | 5.6 | 23.6 | 668 | 63 | 164 |
| 17 | 6 | 64 | 5.6 | 23.9 | 668 | 55 | 165 |
| 18 | 7 | 66 | 6.1 | 23.1 | 636 | 62 | 165 |

TABLE IX

DYNAMIC PROPERTIES (Goodrich Flexometer)

| TESTS | ADDITIVE No. | SC % | DCO % | DCF % | Δ DC % | Δ T BASE °C. | Δ T CORE °C. | PD % |
|---|---|---|---|---|---|---|---|---|
| 11 | — | 17.0 | 12.6 | 19.8 | +7.2 | 30 | 94 | 8.05 |
| 12 | 3 | 19.2 | 12.0 | 17.7 | +5.7 | 23.5 | 84 | 5.20 |
| 13 | 4 | 16.2 | 9.5 | 14.8 | +5.3 | 24 | 84 | 5.25 |
| 14 | 5 | 16.3 | 11.0 | 15.5 | +4.5 | 23 | 80 | 4.9 |
| 15 | 2 | 16.0 | 9.5 | 14.6 | +5.1 | 22.5 | 80.5 | 5.05 |
| 16 | 1 | 17.6 | 10.7 | 15.6 | +4.9 | 21.5 | 75.5 | 5.85 |
| 17 | 6 | 16.2 | 9.95 | 15.75 | +5.8 | 22.5 | 79.5 | 5.85 |
| 18 | 7 | 16.3 | 9.5 | 15.25 | +5.75 | 23 | 77 | 5.55 |

EXAMPLE 4

A series of tests was carried out utilizing the following formulation, in parts by weight:

| | |
|---|---|
| (i) Natural Rubber (SMR 5 L) | 100.00 |
| (ii) Oil DUTREX V 10 | 15.00 |
| (iii) Stearic Acid | 1.50 |
| (iv) Zinc Oxide | 4.00 |
| (v) Antioxidant IPPD | 1.50 |
| (vi) Antioxidant 6PPD | 1.50 |
| (vii) VULCAFOR CBS | 4.00 |
| (viii) Sulfur | 1.00 |
| (ix) Carbon Black N. 347 | 10.00 |
| (x) Silica | 50.00 |
| (xi) Additive No. 1, expressed as a percentage of the silica | |

Operation

Banbury: 1st stage
 (1) Rubber + Antioxidant;
 (2) Filler (Silica (85%) + Carbon black);
 (3) Oil + Stearic acid + Additive + Silica (15%);
 (4) Completion of mixing.
Banbury: 2nd stage
 (1) Mix;
 (2) Accelerator + Sulfur + ZnO;
 (3) Completion of mixing.
Open mill (temperature ≈ 60° C.):
 (1) homogenization of mix and drawing into sheet.

TABLE X

TEST WITH MONSANTO RHEOMETER AT 150° C.

| TESTS | ADDITIVE % | CM | Cm | Δ C | T.90 | T + 2 | INDEX |
|---|---|---|---|---|---|---|---|
| 19 | 0 | 70 | 27 | 43 | 11 mn, 40 sec | 5 mn, 50 sec | 5 mn, 50 sec |
| 20 | 1 | 71 | 28 | 43 | 11 mn, 15 sec | 5 mn, 20 sec | 5 mn, 55 sec |
| 21 | 3 | 67 | 22 | 45 | 8 mn, 45 sec | 4 mn, 10 sec | 4 mn, 35 sec |
| 22 | 7 | 61.5 | 16.5 | 45 | 6 mn, 60 sec | 3 mn, 15 sec | 3 mn, 35 sec |

TABLE XI

STATIC PROPERTIES

| TESTS | ADDITIVE % | SHORE A | MODULUS 100 MPa | MODULUS 300 MPa | BREAKING STRENGTH MPa | ELONGATION BREAKING % | TEAR STRENGTH kg/cm | A. DIN mm3 |
|---|---|---|---|---|---|---|---|---|
| 19 | 0 | 61 | 1.2 | 5.4 | 22.3 | 684 | 55 | 285 |
| 20 | 1 | 62 | 1.4 | 6.5 | 22.4 | 622 | 63 | 265 |
| 21 | 3 | 60 | 1.4 | 6.3 | 22.5 | 626 | 68 | 256 |
| 22 | 7 | 58 | 1.4 | 6.2 | 23.4 | 633 | 69 | 239 |

TABLE XII

| TESTS | ADDITIVE % | SC % | DCO % | DCF % | Δ DC % | Δ T.BASE °C. | Δ T.CORE °C. | PD % |
|---|---|---|---|---|---|---|---|---|
| 19 | 0 | 22.4 | 17.6 | 35.0 | +17.4 | 57.5 | 141 | 14.2 |
| 20 | 1 | 21.7 | 17.9 | 34.9 | +17.0 | 56.5 | 129 | 14.2 |
| 21 | 3 | 21.8 | 15.4 | 19.9 | +4.5 | 24.5 | 79 | 4.2 |
| 22 | 7 | 23.9 | 15.1 | 17.5 | +2.4 | 19 | 67 | 3.35 |

Analysis of Results

Rheometric results:

All mixes containing an interfacing additive tended to fix (T+2) and vulcanize (T. 90) more rapidly, or even far more rapidly than the mix.

Static properties:

The various interfacing additives tested were found to have little effect on properties such as resistance to breaking, modulus or resistance to tearing. The few deviations recorded are considered as marginal.

On the other hand, resistance to abrasion was improved systematically, from 10 to 15%.

All mixtures containing an interfacing additive had their dynamic properties greatly improved relative to reference mix No. 11.

Permanent deformation after testing was reduced from 8% to 5% on the average.

Heat build up was spectacularly reduced by a minimum:

(a) At the base, about 7° C. (30° to 23° C.)
(b) At the core, about of 10° C.

Conclusion

The various interfacing additives tested were not found to have any negative effect.

(1) Static properties, such as breaking strength, modulus and resistance to tearing were maintained;
(2) Resistance to abrasion was improved in all instances;
(3) Dynamic properties and particularly heat build up were improved in all instances.

Thus, the positive effects which are attributed to the interfacing additives consistent herewith are a marked departure from the prior art.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a polymeric composition of matter comprising a polymer matrix and a reinforcing amount of a filler therefor, the improvement which comprises, as an interfacing additive between said matrix and said reinforcing filler, the condensation product of at least one polyamine with at least one carboxylic acid comprising a natural fatty acid or a synthetic carboxylic acid.

2. The composition of matter as defined by claim 1, said reinforcing filler comprising inorganic filler particulates.

3. The composition of matter as defined by claim 1, wherein said fatty carboxylic acid is stearic, oleic, linoleic, linolenic or ricinoleic.

4. The composition of matter as defined by claim 2, wherein said at least one carboxylic acid is butanoic, hexanoic, heptanoic, octanoic, decanoic, dodecanoic, tridecanoic, hexadecanoic or versatic.

5. The composition of matter as defined by any of claims 1, 2, 3 or 4, said at least one polyamine comprising a straight or branched-chain polyalkylene amine, the alkylene radicals thereof having from 2 to 12 carbon atoms.

6. The composition of matter as defined by any of claims 1, 2, 3 or 4, said at least one polyamine comprising a straight or branched-chain polyoxaalkylene amine, the alkylene radicals thereof having from 2 to 3 carbon atoms.

7. The composition of matter as defined by any of claims 1, 2, 3 or 4, said at least one polyamine comprising a tertiary aminoalkyl amine having the structural formula:

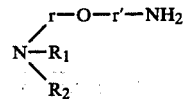

in which r is ethylene or propylene; r' is trimethylene or propylene; $R_1$ is —r—O—r'—$NH_2$ or —r'—$NH_2$; and $R_2$ is —r—O—r'—$NH_2$, —r'—$NH_2$, phenyl or $C_2$-$C_4$ alkyl.

8. The composition of matter as defined by any of claims 1, 2, 3 or 4, wherein said at least one polyamine is trimethylene diamine, tetramethylene diamine, pentamethylene diamine, hexamethylene diamine, heptamethylene diamine, octamethylene diamine, nonamethylene diamine, decamethylene diamine, di(trimethylene)triamine, di(hexamethylene)triamine, ethylene diamine, diethylene triamine, triethylene tetramine, tetraethylene pentamine, pentaethylene hexamine, propylene diamine, dipropylene triamine, tripropylene tetramine, 1,4-bis(2-aminoethyl)piperazine, 1,4-bis(4-aminobutyl)piperazine, N-(2-hydroxyethyl)ethylene diamine, N,N-bis(2-hydroxyethyl)ethylene diamine, mono-hydroxypropyldiethylene triamine, dihydroxypropyltetraethylene pentamine, N-(3-hydroxypropyl)-tetramethylene diamine, tris(2-aminoethyl)amine, N-(2-aminoethyl)tetraethylene pentamine, N,N,N'-tris(3-aminopropyl)ethylene diamine, N,N,N',N'-tetrakis(3-aminopropyl)ethylene diamine, N-(3-aminohexyl)-trimethylene diamine, 1,10-diamino-4,7-dioxadecane, 1,13-diamino-4,7,10-trioxatridecane, 1,8-diamino-3,6-dioxa-1,5,8-trimethyloctane, tris-1,2,3-(2-amino-2-methylethoxy)propane, tris(3-oxa-6-aminohexyl)amine or N-ethyl-bis(3-oxa-6-aminohexyl)amine.

9. The composition of matter as defined by claim 2, said interfacing additive comprising the condensation product of at least one polyamine with at least one carboxylic acid, in a molar ratio of polyamine/carboxylic acid of less than 1.

10. The composition of matter as defined by claim 9, said molar ratio ranging from about 0.4 to about 0.6.

11. The composition of matter as defined by claim 9, said molar ratio being approximately 1.

12. The composition of matter as defined by claim 9, said molar ratio ranging from about 0.7 to about 0.95.

13. The composition of matter as defined by claim 9, said molar ratio being less than about 0.4.

14. The composition of matter as defined by claim 2, further comprising at least one silane coupling agent.

15. The composition of matter as defined by claim 14, said at least one silane coupling agent having the structural formula:

$$R'\!\sim\!Si(OR)_3$$

wherein R' is a reactive organic moiety, $\sim$ is a lower alkylene bridge, and OR is a hydrolyzable alkoxy group.

16. The composition of matter as defined by claim 15, wherein R' is mercapto, azo or carbamoylazoformate.

17. The composition of matter as defined by claim 14, said silane coupling agent comprising gamma-mercaptopropyltrimethoxysilane, bis-(3-triethoxysilylpropyl)-tetrasulfide, di(methylpropyldiethoxysilane)tetrasulfide, hexamethylcyclotrisilthiane, ethyltriethoxysilane polysulfide, or dimethylpropylethoxysilane monosulfide.

18. The composition of matter as defined by claim 2, comprising at least 30 parts of reinforcing filler per 70 parts of matrix.

19. The composition of matter as defined by claim 2, wherein said inorganic filler is a natural or synthetic silica.

20. The composition of matter as defined by claim 19, wherein said inorganic filler is a synthetic silica.

21. The composition of matter as defined by claim 20, wherein said synthetic silica is a precipitated silica.

22. The composition of matter as defined by claims 2 or 21, wherein said polymer matrix comprises an elastomer.

23. The composition of matter as defined by claim 22, wherein said elastomer is natural or synthetic rubber.

24. The composition of matter as defined by claim 23, wherein said elastomer is a natural rubber.

25. The composition of matter as defined by claim 2 or 21, wherein said polymer matrix comprises a thermoplastic synthetic polymer.

26. The composition of matter as defined by claim 25, wherein said synthetic polymer is a polyamide or polyester.

27. The composition of matter as defined by claim 2, said condensation product comprising an amide and an imidazoline.

28. A shaped article comprising the composition of matter as defined by claims 1 or 2.

29. A vulcanized shaped article comprising the composition of matter as defined by claims 1 or 2.

30. The composition of matter as defined by claim 2, said interfacing additive being in pure form.

31. The composition of matter as defined by claim 2, said interfacing additive being premixed with an absorbent carrier therefor.

32. The composition of matter as defined by claim 2, further comprising a plasticizer.

* * * * *